United States Patent Office 3,175,877
Patented Mar. 30, 1965

3,175,877
LITHIUM DECABORANE AMMONIA ADDUCTS PREPARATION
Theodore L. Heying, Tonawanda, N.Y., assignor, by mesne assignments, to the United States of America as represented by the Secretary of the Air Force
No Drawing. Filed Sept. 24, 1958, Ser. No. 763,146
1 Claim. (Cl. 23—14)

This invention relates to the preparation of the new adduct, lithium decarborane ammonia, $Li_2B_{10}H_{14} \cdot NH_3$. More in particular, this invention relates to the preparation of the lithium decaborane ammonia adduct by the direct reaction of lithium and decaborane while they are dissolved in liquid ammonia. The reaction is generally conducted at a temperature of from −60° to +40° C., elevated pressures being used when needed to keep the ammonia in liquid phase. This reaction is expressed by the equation:

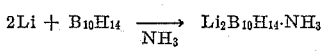

$$2Li + B_{10}H_{14} \xrightarrow{NH_3} Li_2B_{10}H_{14} \cdot NH_3$$

The lithium decaborane ammonia adduct is a white hygroscopic solid which has a melting point above 300° C. It is soluble in liquid ammonia and in water with slow decomposition. An infrared analysis shows that the adduct contains a complexed ammonia molecule.

The lithium decaborane ammonia adduct of this invention can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. The lithium decaborane ammonia adduct when incorporated with oxidizers and a binder is capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following examples illustrate the invention.

Example I

This reaction was performed in a three necked 250 ml. flask fitted with a vacuum inlet, nitrogen flush and stirrer. Approximately 35 ml. of ammonia were condensed in the flask and 0.5 g. of one-quarter inch lithium ribbon was added to the flask. The solution was stirred until all of the lithium was dissolved. Then 3.0 g. of decaborane were added slowly to the lithium ammonia solution. When all of the lithium had been combined with the decaborane, the characteristic blue color of the solution disappeared showing that the stoichiometric amount of lithium had been added. The reaction flask was allowed to warm to room temperature and the ammonia evaporated leaving a white solid. The flask was placed under reduced pressure for two hours to remove the excess ammonia from the solid. The solid was removed from the flask in an inert atmosphere, pulverized, placed under reduced pressure, about 2 mm. mercury, and heated at 100° to 110° C. for two hours. A continued evolution of ammonia was observed. The temperature was slowly raised to 150° C. and a pressure of 1.7 to 2 mm. mercury was maintained. After three hours, a white hygroscopic powder weighing 3.35 g. was obtained. An elemental analysis showed that it contained 67.2, 67.7 percent boron and 9.6, 9.3 percent lithium. The elementary ratio calculated from this analysis compares favorably with the ratio for the compound $Li_2B_{10}H_{14} \cdot NH_3$, the calculated elementary analysis for which is 70.67 percent boron and 9.08 percent lithium. An infrared analysis of the product showed that it contained a complexed ammonia molecule.

Example II

This example was performed in the same apparatus and in the same general manner as described in Example I. Lithium, 0.2 g., was dissolved in approximately 30 ml. of liquid ammonia and decaborane, 2.0 g., was added in small proportions. There was an immediate reaction and the blue color of the lithium ammonia solution gradually disappeared. The ammonia was allowed to evaporate. The light yellow residue obtained was washed twice with ether, then filtered, and maintained under reduced pressure to remove the volatile ammonia. The product was a white powdery solid which was hygroscopic.

An infrared analysis of this product was similar to that obtained for the lithium decaborane ammonia adduct formed in Example I. The elemental analysis showed that it contained 46.0, 46.5 percent boron and 5.1, 5.2 percent lithium. This elementary analysis compares favorably with a compound having a formula

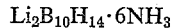

$$Li_2B_{10}H_{14} \cdot 6NH_3$$

Note that in this example, the product was not heated under reduced pressure. Upon heating under reduced pressure, however, additional ammonia can be evolved, as described in Example I, until only one molecule of ammonia remains. When the lithium decaborane ammonia adduct is dissolved in tetrahydrofuran and heated, the ammonia is replaced by tetrahydrofuran with formation of a lithium decaborane tetrahydrofuran adduct.

The boron-containing solid materials produced by practicing the method of this invention can be employed as an ingredient of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing lithium decaborane adducts, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided lithium decaborane adduct can be admixed with a high solids content solution of a partially condensed urea-formaldehyde or phenol-formaldehyde resin, the proportions being such that the amount of the resin is about 5 to 10 percent by weight, based upon the weight of the oxidizer and lithium containing compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

A method for the preparation of a lithium decaborane ammonia adduct which comprises reacting lithium metal and decaborane at a temperature of from −60° to +40° C. while the reactants are dissolved in liquid ammonia and thereafter recovering a lithium decaborane ammonia adduct containing at least 1 mole of ammonia per mole of lithium decaborane from the reaction mixture.

References Cited by the Examiner

UNITED STATES PATENTS

| 2,921,833 | 1/60 | Toeniskoetter et al. | 23—14 |
| 3,021,190 | 2/62 | McElroy et al. | 23—14 |

OTHER REFERENCES

Stock: "Hydrides of Boron and Silicon," page 127 (1935), Cornell University Press.

Stock et al.: "Z. anorg. allgem. Chem.," vol. 228, pp. 178–192 (1936).

Schaeffer: "J. Am. Chem. Soc.," vol. 78, pp. 725–728 (1956).

MAURICE A. BRINDISI, *Primary Examiner.*

ROGER L. CAMPBELL, WILLIAM G. WILES, CARL D. QUARFORTH, *Examiners.*